(12) United States Patent
Mathukia

(10) Patent No.: US 6,902,022 B2
(45) Date of Patent: Jun. 7, 2005

(54) TRACTOR HAVING A CONVERTIBLE FRONT END AND VARIABLE TRACK WIDTH AND RELATED METHODS

(75) Inventor: Shri Bhanjibhai Mathukia, Junagadh District (IN)

(73) Assignee: Society for Research and Initiatives (SRISTI), Gujarat (IN)

( * ) Notice: Subject to any disclaimer, the term of this patent is extended or adjusted under 35 U.S.C. 154(b) by 169 days.

(21) Appl. No.: 10/294,962

(22) Filed: Nov. 14, 2002

(65) Prior Publication Data

US 2003/0230444 A1 Dec. 18, 2003

Related U.S. Application Data

(60) Provisional application No. 60/388,356, filed on Jun. 13, 2002.

(51) Int. Cl.[7] .................... B62D 61/00; B60K 17/00
(52) U.S. Cl. ............... 180/209; 180/374; 180/376; 180/906; 280/638; 280/149.1
(58) Field of Search ............ 280/92, 638, 149.1; 180/374–6, 209, 210, 906

(56) References Cited

U.S. PATENT DOCUMENTS

| | | | |
|---|---|---|---|
| 1,345,498 A | | 7/1920 | McCartney |
| 1,825,394 A | | 9/1931 | Gnaegy |
| 1,856,068 A | | 5/1932 | Walter |
| 1,885,486 A | | 11/1932 | Smyth |
| 2,074,685 A | * | 3/1937 | Engstrom .................. 180/6.4 |
| 2,504,403 A | | 4/1950 | Finley |
| 2,750,199 A | * | 6/1956 | Hart ........................... 280/638 |
| 2,874,972 A | * | 2/1959 | Andersen et al. ............. 280/92 |
| 2,890,892 A | * | 6/1959 | Strehlow .................... 280/92 |
| 3,672,140 A | | 6/1972 | Furford |
| 3,721,077 A | | 3/1973 | Van der Lely |
| 3,841,429 A | | 10/1974 | Falcone et al. |
| 4,508,188 A | | 4/1985 | Duke |
| 4,585,084 A | | 4/1986 | Van der Lely |
| 4,736,809 A | * | 4/1988 | Kumazawa ................. 180/339 |

(Continued)

FOREIGN PATENT DOCUMENTS

| | | |
|---|---|---|
| CN | 87207989 U | 8/1988 |
| CN | 1076582 | 9/1993 |
| CN | 2215442 U | 12/1995 |
| CN | 1129658 | 8/1996 |
| CN | 2289373 U | 9/1998 |
| CN | 2306636 U | 2/1999 |
| CN | 1229571 | 9/1999 |
| CN | 1240180 | 1/2000 |
| EP | 0025677 B1 | 1/1985 |
| EP | 0196643 B1 | 10/1986 |
| EP | 00421281 A1 | 10/1989 |
| EP | 0364002 A2 | 4/1990 |
| FR | 2676203 | 11/1992 |
| GB | 2058686 | 4/1981 |
| WO | WO 97/34051 | 9/1997 |

*Primary Examiner*—Paul N. Dickson
*Assistant Examiner*—Laura B. Rosenberg
(74) *Attorney, Agent, or Firm*—Kirkpatrick & Lockhart Nicholson Graham LLP

(57) ABSTRACT

A tractor having a front end and a rear end adaptable for a variety of different environments. Methods related to the conversion of the tractor are also disclosed. In one embodiment, the invention includes a front wheel assembly that is removably attached to the front end of the tractor to facilitate adaptation of the tractor a various environments. Also, a steering actuator is removably attached to the front wheel assembly and fixedly attached to the chassis of the tractor.

4 Claims, 7 Drawing Sheets

U.S. PATENT DOCUMENTS

| | | | | |
|---|---|---|---|---|
| 4,895,217 A | * | 1/1990 | Hueckler et al. | 180/233 |
| 4,924,961 A | * | 5/1990 | Bernardi | 180/374 |
| 5,005,913 A | | 4/1991 | Kittle et al. | |
| 5,013,058 A | | 5/1991 | Kruger | |
| 5,361,860 A | | 11/1994 | Smith et al. | |
| 5,562,166 A | | 10/1996 | Griffen | |
| 5,890,986 A | * | 4/1999 | Pritchard et al. | 475/206 |
| 5,970,800 A | | 10/1999 | Gunneskov et al. | |
| 5,971,881 A | | 10/1999 | Jolliff | |
| 6,070,402 A | | 6/2000 | Korthius et al. | |
| 6,139,045 A | * | 10/2000 | Vandenbark et al. | 280/638 |
| 6,152,240 A | | 11/2000 | Nonhoff et al. | |
| 6,273,189 B1 | | 8/2001 | Gissler et al. | |
| 6,655,488 B2 | * | 12/2003 | Braud | 180/233 |

* cited by examiner

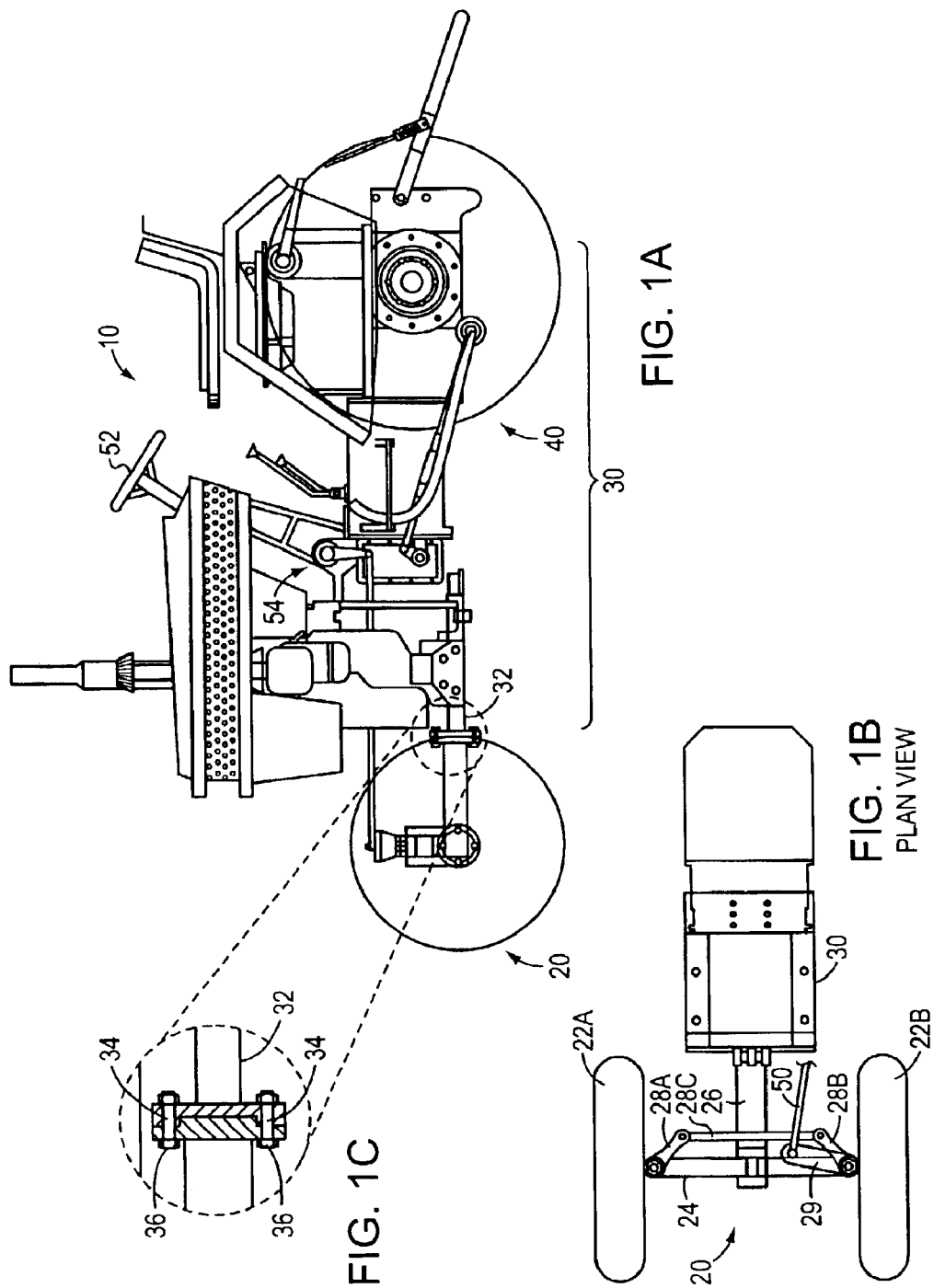

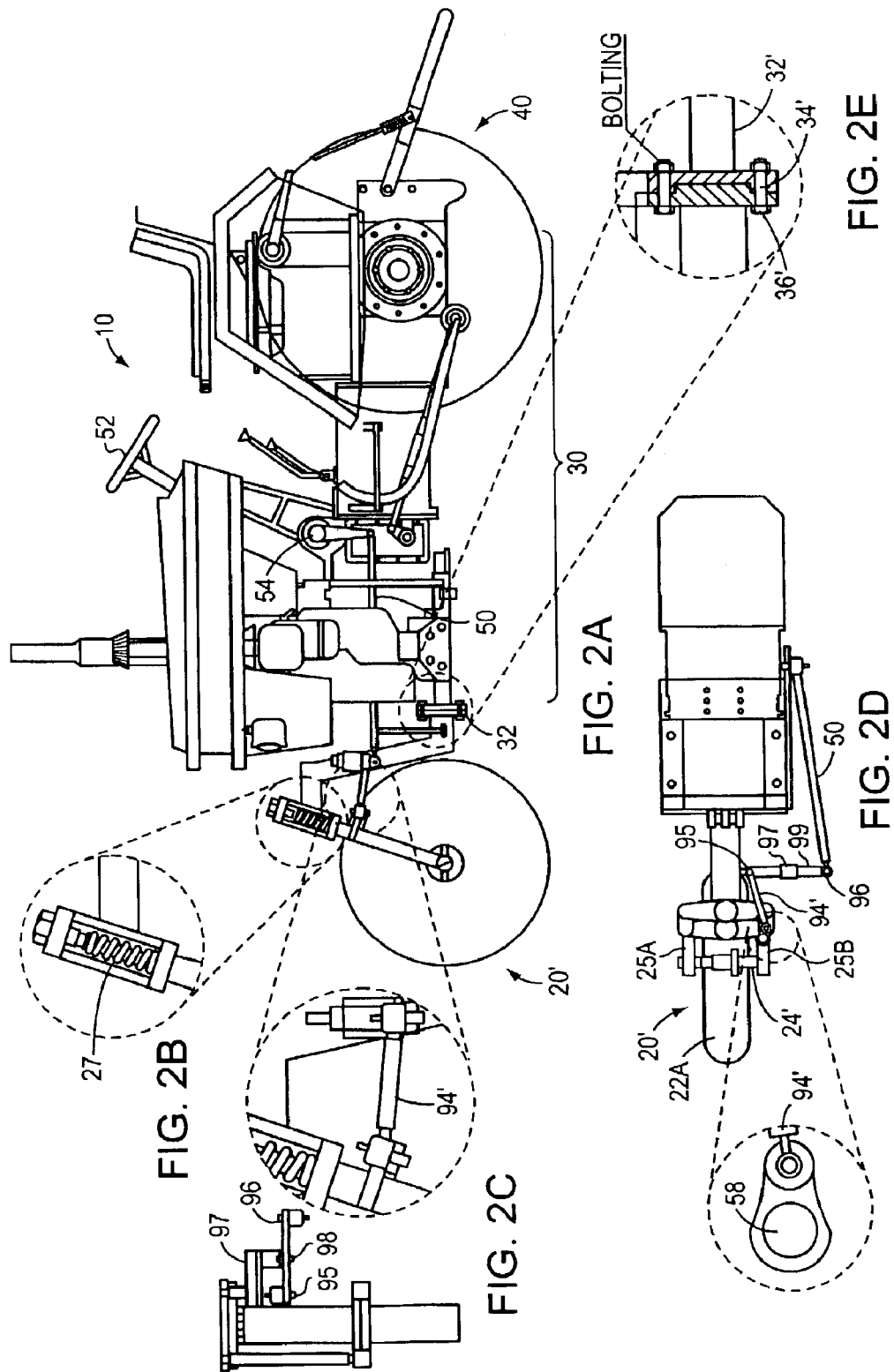

TRACTOR HAVING A CONVERTIBLE FRONT END AND VARIABLE TRACK WIDTH AND RELATED METHODS

CROSS-REFERENCE TO RELATED APPLICATIONS

This application claims the benefit of and priority to U.S. Provisional Patent Application No. 60/388,356, filed on Jun. 13, 2002, the entire disclosure of which is hereby incorporated by reference.

FIELD OF THE INVENTION

The invention relates generally to a tractor and more specifically to a tractor with an interchangeable front wheel assembly and variable rear wheel track width.

BACKGROUND OF THE INVENTION

Generally, tractors are designed with the large landowner and corporate farms in mind. For example, the components of the tractor (i.e., the engine, electrical system, and transmission) are highly integrated. Therefore, in the event of a mechanical or electrical problems the tractor requires service by highly specialized technicians and transportation of the tractor to the repair shop for even the most minor of malfunctions. In many developing nations, the farmer must often be the service technician, and thus be able to locate and repair any failures that may happen without requiring the entire tractor be taken into the repair shop.

Furthermore, the turning radius of most tractors is tailored to the large empty spaces that exist in most fields of the large land owner or corporate farmer. Most often, the front end of the tractor includes a fixedly attached two wheel assembly and a fixed rear wheel track width. The farmers of many developing nations typically have land tracts that are a fraction of the size of those for which most tractors are designed, and cannot afford empty spaces at the ends thereof dedicated only to the turning of the tractor.

Therefore, there exists a need for a service friendly tractor having a variable rear wheel track width and an adaptable front end to vary the turning radius as needed.

SUMMARY OF THE INVENTION

The invention is directed to a tractor having an interchangeable front wheel assembly and an adjustable rear wheel track width. The removable front wheel assembly allows for easy conversion between a single wheel and a two wheel front wheel assembly. In combination with the interchangeable front wheel assembly, the adjustable rear wheel track width allows for the manipulation of the turning radius of the tractor. Additionally, the modular design of the components of the tractor facilitate repair of individual components without the need for bringing the entire tractor in for repair.

In one aspect, the invention is directed to a tractor. The tractor has a front end and rear end. The tractor includes a front wheel assembly, an attachment mechanism, and a steering actuator. The attachment mechanism is at the front end of the tractor and is configured to removably attach the front wheel assembly to the tractor. The steering actuator is fixedly attached to a steering mechanism on the tractor. Also, the steering actuator is removably attached to the front wheel assembly. The front wheel assembly may include one wheel or two wheels.

In one embodiment, the attachment mechanism may include a mounting mechanism that receives a corresponding mounting mechanism, which is part of the front wheel assembly. The mounting mechanisms can include bores that receive fasteners to attach the front wheel assembly to the front end of the tractor.

In another embodiment, the rear end of the tractor includes at least one rear axle, two rear wheels, and a spacer placed between each of the wheels and the axle. The spacer allows the width between the rear wheels to be adjusted. For example, the width of the rear wheels may be greater than or equal to the width of the front wheel assembly having two wheels.

In another embodiment, the tractor includes a power transmission unit having a clutch assembly, a gear box and a rear end differential box. The clutch assembly is in communication with the gear box and engine.

The gear box includes an input shaft, a first output shaft, a lay shaft, and a second output shaft. The first output shaft includes two gears. A first gear for providing a low range speed and a second gear for providing a high range speed. The lay shaft includes a first gear, a second gear, and a reverse gear, and is in communication with the first output shaft and the second output shaft. The second output shaft includes a first shifter gear and a second shifter gear. The first shifter gear is in communication with the first gear of the lay shaft and the reverse gear. The second shifter gear is in communication with the second gear of the lay shaft and also is in communication with the first output shaft via a set of splines.

The rear end differential box is in communication with the gear box. A set of final gears that deliver power to the rear end of the tractor is disposed within the rear end differential box. The gears of the rear end differential box and the gear box are viewable when a top cover of each box is removed.

In another aspect, the invention is directed to a method of facilitating the conversion of tractor for use in a variety of environments. The tractor includes a front end and a rear end. The method includes the steps of removing a first front wheel assembly from the front end of the tractor, and a steering actuator from the front wheel assembly. In turn, a second front wheel assembly is attached to the front end of the tractor and the steering actuator is attached to the second front wheel assembly.

In one embodiment, the method includes the steps of removing a rear wheel from a rear axle of the rear end of the tractor, attaching a spacer to the rear axle to control the width of the rear end of the tractor, and reattaching the rear wheel.

BRIEF DESCRIPTION OF THE DRAWINGS

The invention is pointed out with particularity in the appended claims. The advantages of the invention may be better understood by referring to the following description taken in conjunction with the accompanying drawing in which:

FIGS. 1A–1C are various views of an embodiment of a tractor of the invention with a front wheel assembly having two wheels;

FIGS. 2A–2E are various views of an embodiment of a tractor off the invention with a front wheel assembly having one wheel;

DETAILED DESCRIPTION OF THE INVENTION

Figure 3A:
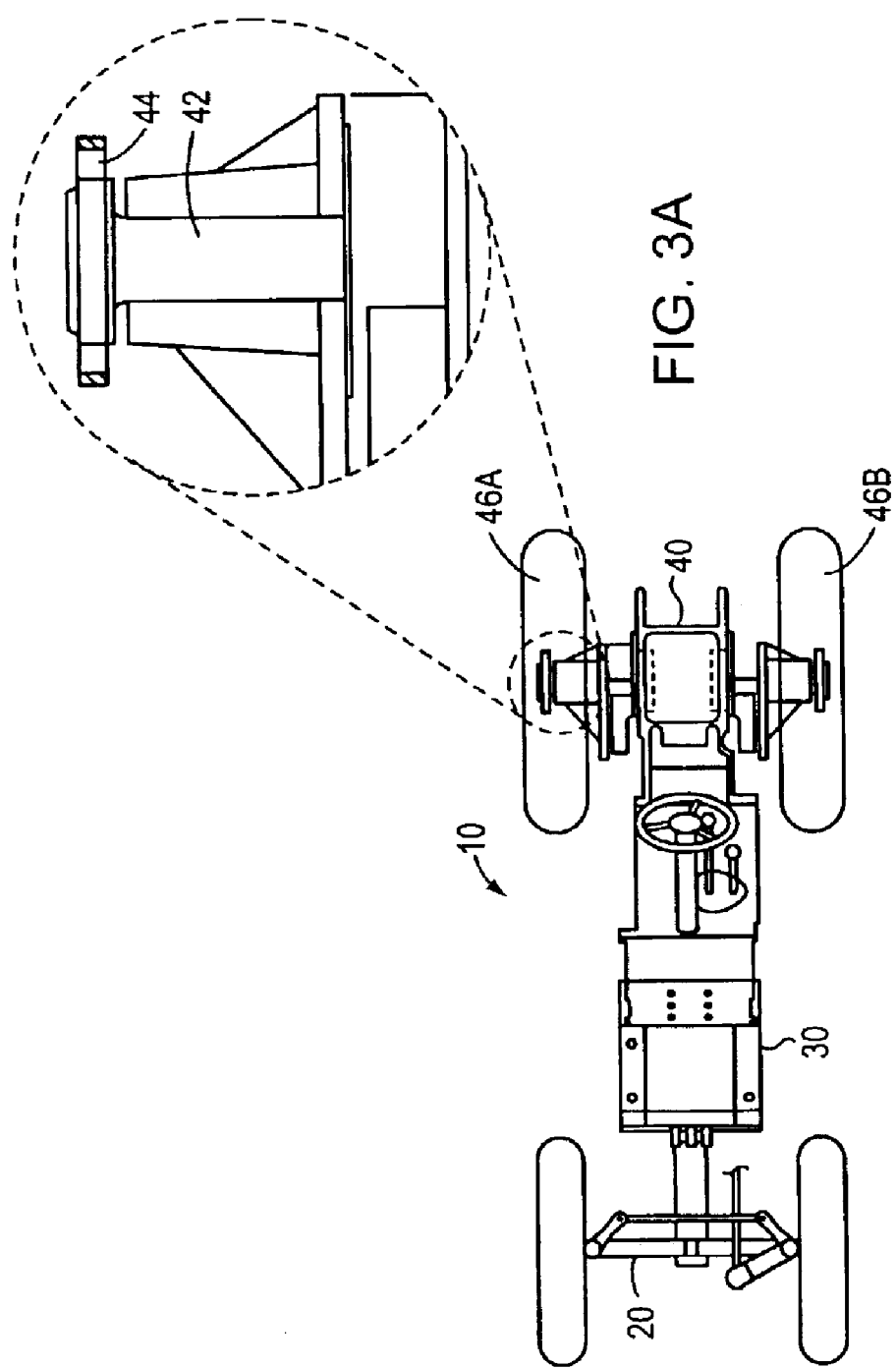
FIGS. 3A–3C are plan views of various embodiments of a tractor having a variable track width.

With reference to FIGS. 1A–1C, in one-embodiment a tractor 10 includes a front wheel assembly 20 attached to a chassis 30, which includes a rear wheel assembly 40. The front wheel assembly 20 includes, in one embodiment, a pair of front wheels 22A and 22B attached to a front axle 24. The front axle 24 can be a solid front axle or a split front axle to provide independent suspension of the two front wheels 22A and 22B. A pair of steering joints 28A and 28B are attached to a stabilizer bar 28C to facilitate turning of the front wheels 22A and 22B. Additionally, a steering actuator 50 is removably attached to a steering actuator attachment mechanism 29. The steering actuator 50 is removably attached to a steering mechanism 54 (e.g., a steering wheel) on the chassis 30 of the tractor 10.

As an operator turns the steering wheel 52, the steering mechanism 54 of the chassis 30, the steering actuator 50, the steering actuator attachment mechanism 29, the steering joints 28A and 28B, and the stabilizer bar 28C cooperate to facilitate the turning of the front wheels 22A and 22B. For example, if the steering wheel 52 is turned to the right, the steering actuator 50 is pulled back (i.e., towards the rear wheel assembly 40). In turn, the steering actuator attachment mechanism 29 is pulled back (i.e., moves toward the rear wheel assembly) and thus the steering joints 28A and 28B and stabilizer bar 28C cooperate to turn the front wheels 22A and 22B to the right. In order to facilitate a left turn, the steering wheel 52 forces the steering actuator 50 forward (i.e., toward the front wheels 22A and 22B). Similar to the above, the steering actuator attachment mechanism 29 is pushed forward (i.e., moves toward the front wheels 22A and 22B) and thus the steering joints 28A and 28B and stabilizer bar 28C cooperate to turn the front wheels 22A and 22B to the left.

The front axle 24 is attached to a front wheel assembly attachment bar 26, which is removably attached to the chassis 30. The chassis 30 includes, at the front end, an attachment mechanism 32 configured to receive the front wheel assembly attachment bar 26. In more detail, the attachment mechanism 32 includes a mounting mechanism configured to a receive a corresponding mounting mechanism of the front wheel assembly 20. In one embodiment, the mounting mechanisms are shaped to facilitate proper alignment and retention of the front wheel assembly 20 to the chassis 30. The mounting mechanisms include bores 34 adapted to a receive fasteners 36. The fasteners 36 can include, but are not limited to bolts, rivets, pins and the like.

With reference to FIGS. 2A–2E, in one embodiment the tractor 10 includes a front wheel assembly 20' attached to the chassis 30, which includes a rear wheel assembly 40. In one embodiment, the front wheel assembly 20' includes a single front wheel 22A'. The front wheel assembly 20' includes a pair of front forks 25A and 25B. The front forks 25A and 25B are attached to a front axle 24' to hold the front wheel 22A' in place. Additionally, the front forks 25A and 25B are attached to a suspension mechanism 27 (e.g., a coil, leaf spring, shock, strut, hydraulic mechanism, or gas mechanism), which provides suspension of the front wheel assembly 20' during operation. The steering actuator 50 is removably attached to a steering actuator bar 99 at a pivot point 96. The steering actuator bar 99 is fixed to a fabricated extension 97 of the front axle 24' through a pivot pin 98. The steering actuator bar 99 is attached to a steering actuator mechanism 94 at a pivot point 95. The steering actuator mechanism 94 is attached to at least one of the front forks 25A and 25B.

The steering actuator mechanism 94 is removably attached at a pivot point 52 to the steering actuator attachment mechanism 29'. The steering actuator attachment mechanism 29' includes an attachment point 58, which attaches the steering actuator mechanism 94 to the forks 25B. In one embodiment, the attachment point 58 is a bore configured to a receive a pin.

As an operator turns the steering mechanism of the chassis the steering actuator 50 facilitates turning of the front wheel 22A'. For example, if the steering wheel 52 is turned to the right, the steering actuator 50 is pulled back (i.e., towards the rear wheel assembly 40). In turn, the pivot point 96 is pulled back towards the rear wheel assembly 40. This causes the actuator bar 99 to rotate counterclockwise about pivot pin 98. In turn, the steering actuator mechanism 94' is pushed forward (i.e., moves away from the rear wheel assembly), and the front wheel 22A' moves to the right. In order to facilitate a left turn, the steering wheel 52 forces the steering actuator 50 forward (i.e., away from the rear wheel assembly 40). In turn, the pivot point 96 is pushed forward away from the rear wheel assembly 40. This causes the actuator bar 99 to rotate clockwise about pivot pin 98. In turn, the steering actuator mechanism 94' is pulled backward (i.e., moves toward the rear wheel assembly), and the front wheel 22A' moves to the left.

The suspension mechanism 27 is attached to a front wheel assembly attachment bar 26', which is removably attached to the chassis 30. The front wheel attachment bar 26' is shaped to provide attachment of the single front wheel assembly to the chassis at the same point as the two wheel configuration. The chassis 30 includes, at the front end, an attachment mechanism 32 to receive the front wheel assembly attachment bar 26'. In more detail as described above, the attachment mechanism includes a mounting mechanism configured to a receive a corresponding mounting mechanism of the front wheel assembly 20. In one embodiment, the mounting mechanisms are shaped to facilitate proper alignment and retention of the front wheel assembly 20'. The mounting mechanisms include bores 34 adapted to a receive fasteners 36. The fasteners 36 can include, but are not limited to bolts, rivets, pins and the like.

It is often desirable to change between a front wheel assembly having one wheel and a front wheel assembly having two wheels. To accomplish this end, a block, jack, or other height adjusting mechanism is placed under the chassis 30 to maintain the height of the chassis. The fasteners 36 are removed from the mounting mechanisms. Also, the steering actuator 50 is detached. Thereafter, the front wheel assembly is removed and replaced with the other front wheel assembly. The fasteners 36 are reattached to secure the front wheel assembly in place. In turn, the steering actuator of the front wheel assembly having two wheels is attached.

Figure 3B:
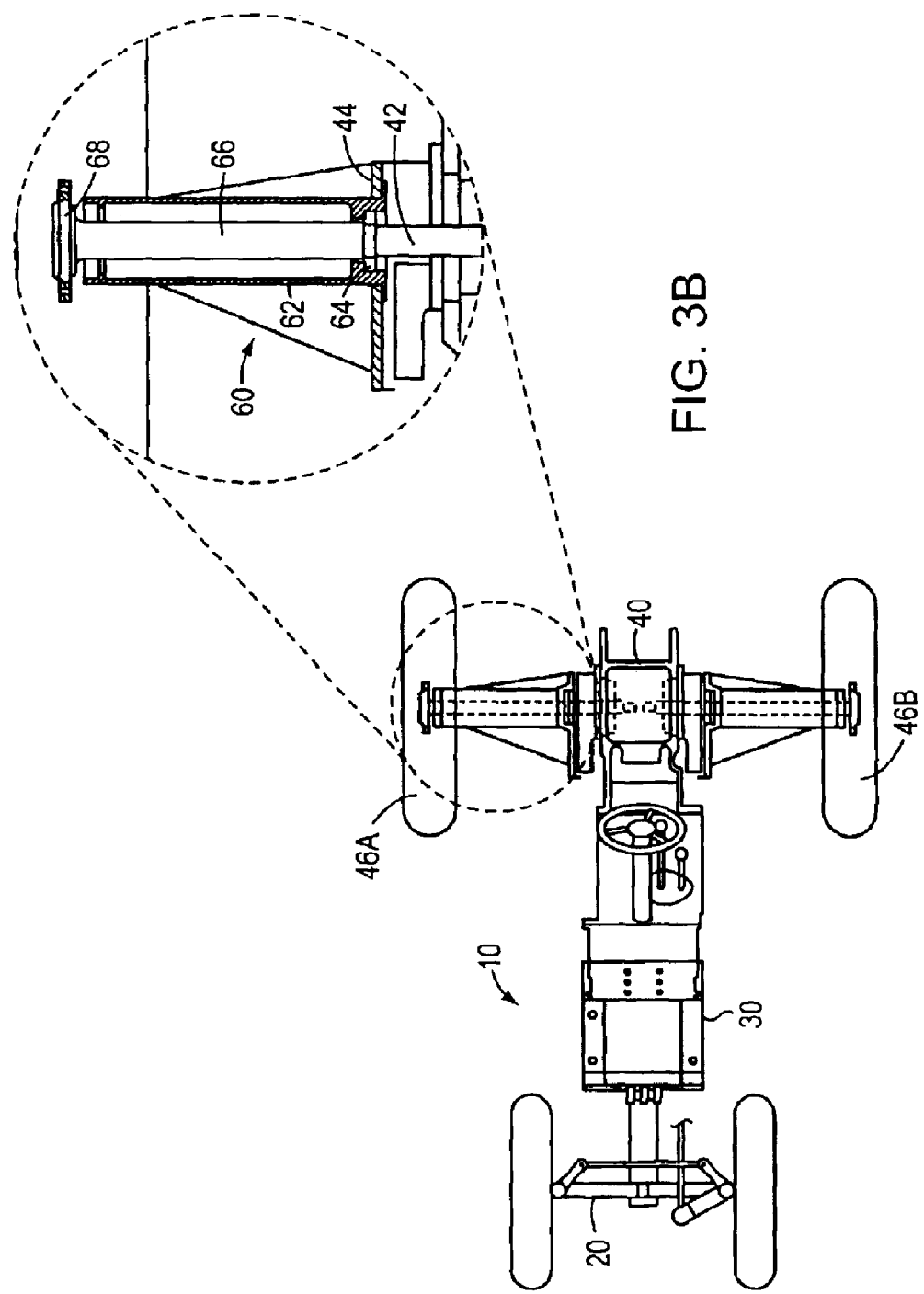
Figure 3C:
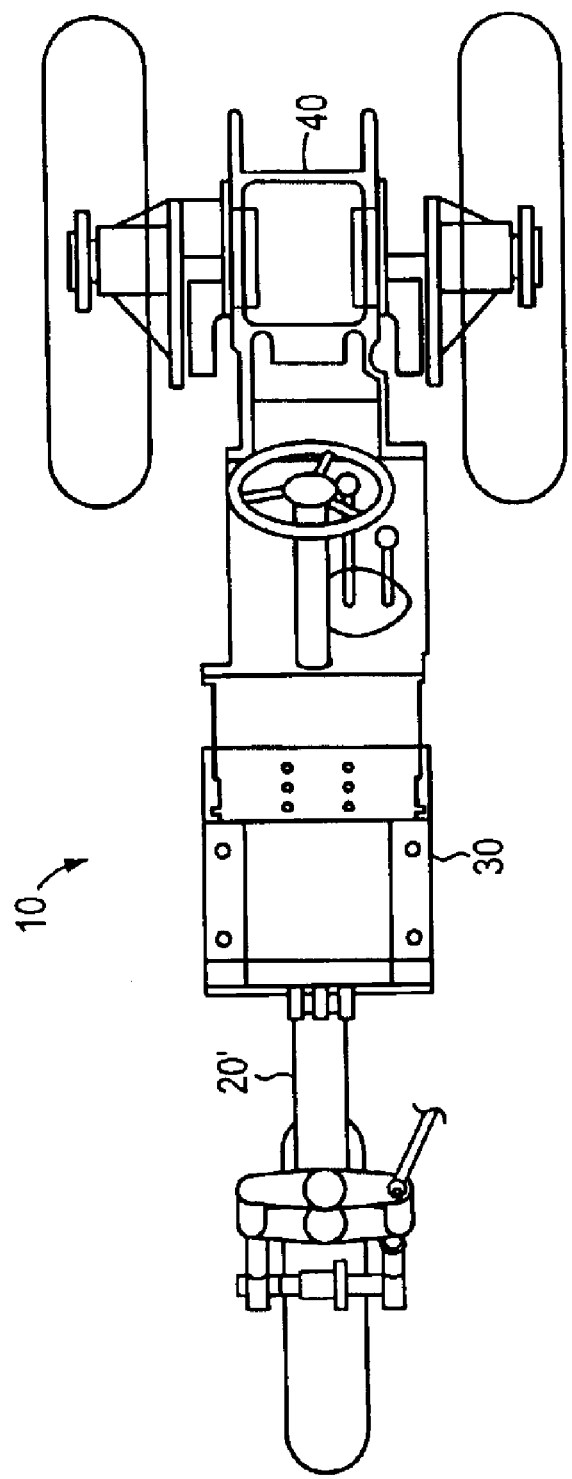

With reference to FIGS. 3A–3C, the track width of the rear wheel assembly 40 of the tractor 10 is adjustable to accommodate various crop spacings and farm implementations. As shown in FIG. 3A, the rear wheel assembly 40 includes a rear axle 42, which transfers power to a rear axle flange 44. A pair of rear wheels 46A and 46B is attached to each rear axle flange 44. The rear axle 42 receives power from a rear differential, as described below in FIGS. 4A and 4B. As shown, the track width of the rear wheels is substantially equal to the width of the front wheel assembly 20 having two wheels.

With reference to FIG. 33, the track width of the rear wheels can be increased by the attaching a spacer 60 to the rear axle flange 44. The spacer 60 includes a spacer body 62, a rear axle attachment flange 64, a spacer axle 66, and a wheel attachment flange 68. In one embodiment, the spacer body is composed of cast iron, although other materials are possible. The rear axle attachment flange 64 is disposed at one end of the spacer body 62. The spacer axle 66 is disposed within the spacer body 62 and attached to the rear axle attachment flange 64 at one end of the spacer axle 66. The other end of the spacer axle 66 is attached to the wheel attachment flange 68. The wheel attachment flange is substantially similar to the rear axle flange 44. The rear wheel is attached to the wheel attachment flange 68.

To change the track width of the rear wheels, a block, jack, or other height adjustment mechanism is placed in communication with the chassis to hold the rear wheel assembly 40 at a height necessary to facilitate the removal of the rear wheels 46A and 46B. The rear wheels 46A and 46B are removed from the rear axle flange 44. The spacer body 62 is attached to the rear axle flange 44. More specifically, the rear axle attachment flange 64 is attached to the rear axle flange 44 by fasteners, such as, bolts. In turn, the rear wheels are attached to the wheel attachment flange 68. The spacer 60 thereby increases the track width of the rear wheel assembly 40 such that it is greater than the width of the front wheel assembly 20 having two wheels.

The turning radius of the tractor is a direct function of the track width of the rear wheel assembly and the front wheel assembly configuration. For example, as shown in FIG. 3C, when a front wheel assembly 20' having only a single wheel is used, the turning radius of the tractor 10 is less than the turning radius of a tractor 10 having a front wheel assembly 20 with two wheels. Additionally, if the track width of the rear wheels is increased using the spacer 60, as in FIG. 3B, the turning radius of the tractor is affected. As such, the turning radius of the tractor 10 is a function of the front wheel assemblies and the track width of the rear wheels.

Figure 4A:
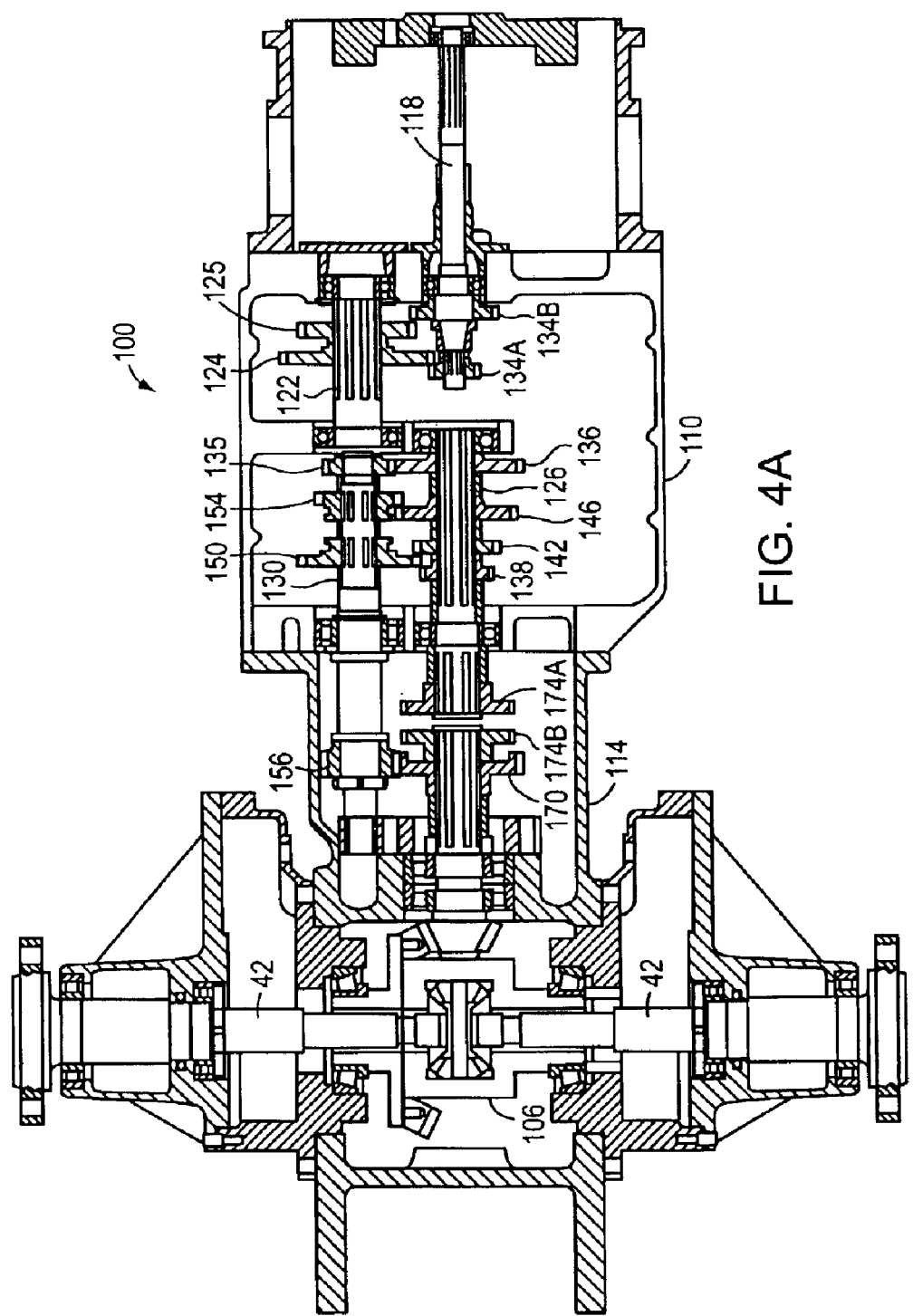
FIG. 4A is a top view of an embodiment of a transmission of the tractor of the present invention.
Figure 4B:
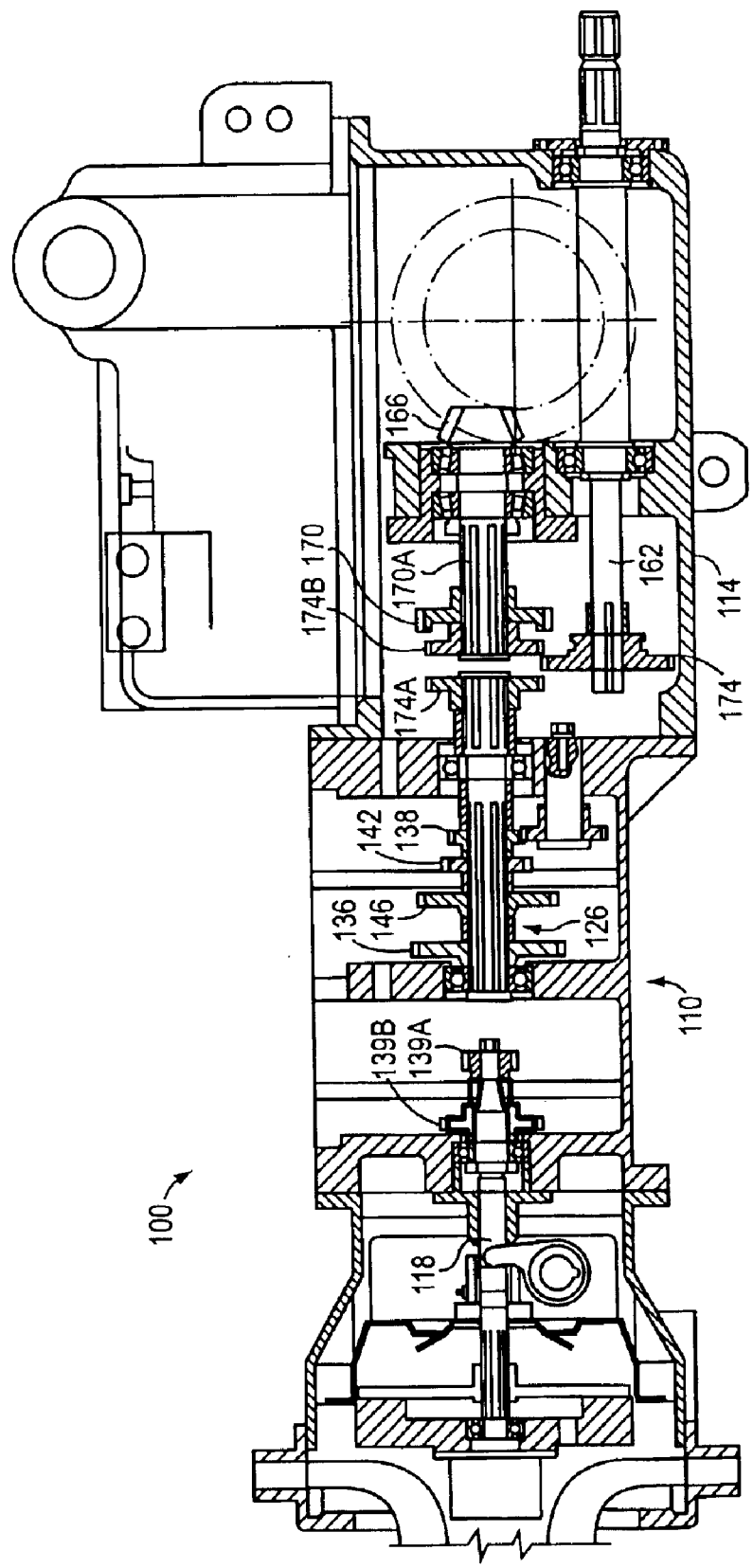
FIG. 4B is a side view of an embodiment of the transmission of FIG. 4A.

With reference to FIGS. 4A and 4B, the tractor 10 includes a transmission 100 having gear box 110 and a rear differential 114. An input shaft 118 transfers power from the engine of the tractor to the gear box 110. Power is transferred from the gear box 110 the rear differential 114, which, in turn, rotates the rear axle 42 and turns the rear wheels 46A and 46B. The gear box 110 and rear differential 114 each include a top cover (not shown). Removing the top covers of each of the gear box 110 and rear differential 114 exposes the gears within. As such, the gears are easily accessible for trouble shooting and repair.

In more detail, the gear box 110 includes a portion of the input shaft 118, a first output shaft 122, a lay shaft 126, and a final output shaft 130. The input shaft 118 includes a first gear 134A that engages a low range gear 124, a second gear 134B that engages a high range gear 125 on the first output shaft 122. The low range gear 124 and high range gear 125 allow two different speeds of rotation for each gear on the lay shaft 126. Power is transferred from the input shaft 110 to the lay shaft 126 via the first output shaft 122, through gear pinion 135 and gear 136 of the lay shaft.

The lay shaft 126 includes a reverse gear 138, a first forward gear 142, and a second forward gear 146. A third forward gear is provided by transferring power directly from the first output shaft 122 to the final output shaft 130 through a spline drive (not shown), as described in more detail below.

The final output shaft 130 includes a first shifter gear 150, which engages the reverse gear 138 and the first forward gear 142. Also, the final output shaft includes a second shifter gear 154, which engages the second forward gear 146 and the internal spline drive, which provides the third forward gear. The internal splines (not shown) of gear 154 engage a set of external splines (not shown) on first output shaft 122. The final output shaft 130 is in communication with the rear differential 114.

A set of final gears 158, a high power gear assembly 166, and a high power gear 170 are located in the rear differential 114. The final gears 158 receive power from the final output shaft 122 and deliver it to the rear axle 42 via the high power gear 170 and high power gear assembly 166.

A power take-off (PTO) shaft 162 can provide two speeds, one is directly proportional to the engine speed, and the other is proportional to the rotational speed of the rear wheels. To provide a PTO shaft speed proportional to the engine speed, a PTO gear 174A, which is on the lay shaft 126, is selected by a PTO shifter (not shown) to engage a PTO shifter gear 174. When selected, power is transferred from the lay shaft 126 to the PTO shaft 162. Alternatively, the PTO shaft can receive power from a gear 174B fixed on a hypoid pinion 170A. As such, the speed of the PTO shaft 162 is directly proportional to the rotational speed of the rear wheels 46A and 46B.

In operation, the operator of the tractor 10 uses a gear selector (not shown) to select either one of the three forward gears or the reverse gear. More specifically, the gear selector may cause either of the shifter gears 150 or 154 to engage one of the forward gears 142 or 146, the splines of the gear 154, or the reverse gear 138. Additionally, the operator uses a high/low range selector (e.g., a hand clutch or the like) to select an operating range of the gears. More specifically, by selecting the high range, high range gear 125 engages the second spindle 134B. Alternatively, if the low range is desired, the low range gear 124 engages the first gear 134A.

As the engine runs, power from the input shaft 118 is transferred to the first output shaft 122 via the first gear 134A or the second gear 134B. The gear ratio between the first gear 134A and the high range gear 125 or the second gear 134B and the low range gear 124 determines the rotational speed of the first output shaft 122. In turn, power maybe transferred either directly to the final output shaft 130, by engaging the splines of gear 154 with the first output shaft 122. Alternatively, power is transferred to the lay shaft 126, and in turn, to the final output shaft 130, if one of the first forward gear 142, second forward gear 146, or reverse gear 138 is selected. Depending on the gear selected, the rotational speed of the final output shaft 130 is determined by the gear ratio between the chosen shifter gear and the gear on the lay shaft that the shifter gear engages. Power from the final output shaft 130 is transferred to the final gear 158, and, in turn, to the high power pinion 170. The high power gear assembly 166 receives the power from the high power pinion 170 and rotates the rear axle 42. Although describes as having six forward speeds and two reverse speeds (i.e., a high and low range for each of the forward and reverse gears), the transmission is not limited to any particular number of gears.

Having shown the preferred embodiments, one skilled in the art will realize that many variations are possible within the scope and spirit of the claimed invention. It is therefore the intention to limit the invention only by the scope of the claims.

What is claimed is:

1. A tractor having a front end and a rear end, said tractor being adaptable to a plurality of front wheel assemblies, said tractor comprising:

one of said plurality of front wheel assemblies;

an attachment mechanism at said front end of said tractor, said attachment mechanism configured to selectively attach said one of said plurality of front wheel assemblies to said front end of said tractor;

a steering actuator, said steering actuator being fixedly attached to a steering mechanism of said tractor, and being selectively attached to said one of said plurality of front wheel assemblies; and a power transmission unit, the power transmission unit comprising:
 a clutch assembly;
 a gear box in communication with the clutch assembly, said gear box comprising:
  an input shaft for providing power from an engine of said tractor,
  a first output shaft in communication with said input shaft, said first output shaft comprising two gears, a first gear for providing a low range speed and a second gear for providing a high range speed;
  a lay shaft in communication with said first output shaft, said lay shaft comprising a first gear, a second, and a reverse gear; and
  a second output shaft in communication with said lay shaft and in removable communication with said first output shaft, said second output shaft comprising a first shifter gear in removable communication with said first gear of the lay shaft and said reverse gear of said lay shaft, and a second shifter gear in
  removable communication with said second gear of said lay shaft and a set of splines; and a rear end differential box in communication with said gear box, said rear end differential box comprising a set of final gears for delivering power to said rear end of said tractor, wherein each of said gears of the gear box and said rear end differential is viewable when a top cover of each of said gear box and said rear end differential box is removed.

2. A method of facilitating the conversion of a tractor having a front end and a rear end for use in a variety of environments comprising:

removing a first one of a plurality of front wheel assemblies from said front end of said removing a steering actuator from said first one of said one of said plurality of front wheel assemblies;

attaching a second one of said plurality of front wheel assemblies to said front end of said attaching said steering actuator to said second one of said plurality of front wheel assemblies;

removing a first rear wheel from a rear axle;

attaching a first spacer to said rear axle; and attaching said first rear wheel to said first spacer to thereby control a width of said rear end of said tractor.

3. The method of claim 2, further comprising the steps of:

removing a second rear wheel from a rear axle;

attaching a second spacer to said rear axle; and attaching said second rear wheel to said second spacer to thereby control a width of said rear end of said tractor.

4. The method of claim 3, wherein the width of said rear end of said tractor is greater than or equal to a width of a two wheel front wheel assembly.

* * * * *